United States Patent
LaForest et al.

(10) Patent No.: US 7,252,499 B2
(45) Date of Patent: *Aug. 7, 2007

(54) APPARATUS FOR UNIDIRECTIONAL INFILTRATION OF PREFORM WITH MOLTEN RESIN OR PITCH

(75) Inventors: Mark L. LaForest, Granger, IN (US); Christopher S. Wahlers, South Bend, IN (US); Barry P. Soos, Mishawaka, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/177,342

(22) Filed: Jul. 11, 2005

(65) Prior Publication Data

US 2005/0266118 A1 Dec. 1, 2005

Related U.S. Application Data

(62) Division of application No. 10/316,615, filed on Dec. 11, 2002, now Pat. No. 6,939,490.

(51) Int. Cl.
*B29C 45/00* (2006.01)
(52) U.S. Cl. .................. 425/557; 425/129.1; 425/116; 425/546; 264/328.12
(58) Field of Classification Search ............. 425/116, 425/129.1, 557, 546; 264/328.12
See application file for complete search history.

(56) References Cited

U.S. PATENT DOCUMENTS 3,135,019 A * 6/1964 Aichele ................ 425/126.1
4,412,804 A * 11/1983 Huther ..................... 425/546
4,986,943 A 1/1991 Sheaffer et al.
5,059,370 A 10/1991 Kojima
5,248,467 A 9/1993 Cushman
5,306,448 A 4/1994 Kromrey
5,362,226 A * 11/1994 Kataoka et al. ............ 425/526
5,654,059 A 8/1997 Hecht
5,756,019 A * 5/1998 Nakazawa et al. ......... 264/40.5
5,770,127 A 6/1998 Abrams et al.
5,804,230 A * 9/1998 Hasegawa et al. .......... 425/557
6,001,292 A * 12/1999 Atake ....................... 264/135
6,325,608 B1 12/2001 Shivakumar et al.
6,855,286 B2 * 2/2005 Osawa et al. .......... 264/328.12

FOREIGN PATENT DOCUMENTS

EP 0 348 129 A2 12/1989
WO WO-02/18120 A2 8/2001

* cited by examiner

*Primary Examiner*—Robert Davis
*Assistant Examiner*—G. Nagesh Rao
(74) *Attorney, Agent, or Firm*—Birch, Stewart, Kolasch & Birch, LLP

(57) ABSTRACT

Molding apparatus for rapid transfer of molten resin or pitch in an infiltration molding process. The apparatus includes e.g. an extruder (4) for melting and conveying a resin or pitch and a mold (10) arranged so that resin or pitch is conveyed to a mold insert cavity (19) within the mold. The mold insert contains an internal protrusion such as a locating ring (25) for positioning a porous body (1, 18) within the mold insert cavity in a position that brings about unidirectional flow of the molten resin or pitch through the porous body. Also, rapid resin or pitch infiltration molding process that includes injecting a high melting point, high viscosity, molten resin or pitch into the mold to effect a unidirectional impregnation of a heated preform via a pressure gradient in the mold.

9 Claims, 5 Drawing Sheets

APPARATUS FOR UNIDIRECTIONAL INFILTRATION OF PREFORM WITH MOLTEN RESIN OR PITCH

This application is a divisional of application Ser. No. 10/316,615, filed Dec. 11, 2002, now U.S. Pat. No. 6,939,490 B2. Applicants claim priority under 35 U.S.C. §120 to application Ser. No. 10/316,615. The entire contents of application Ser. No. 10/316,615 is hereby expressly incorporated by reference.

FIELD OF THE INVENTION

This invention relates to a process for rapidly densifying high temperature materials, including carbon-carbon composites and porous performs, with high viscosity resins or pitch, using resin transfer molding techniques, and to an apparatus for carrying out the process.

BACKGROUND OF THE INVENTION

To make parts suitable for demanding friction applications such as aircraft braking, high temperature materials such as carbon-carbon composites, carbon and ceramic fiber reinforced preforms, and carbon and ceramic foams are densified by Chemical Vapor Deposition/Chemical Vapor Infiltration (CVD/CVI) and/or by liquid infiltration with a resin or with pitch. Densification is accomplished by converting the resin or pitch within the preform into carbon.

Impregnation of porous bodies with resins and pitches typically involves vacuum/pressure infiltration (VPI). In the VPI process, a volume of resin or pitch is melted in one vessel while a porous preform is contained in a second vessel under vacuum. The molten resin or pitch is transferred into the porous preform contained in the second vessel using a combination of vacuum and pressure. The VPI process is limited to using resins and pitches that possess low viscosity and associated low carbon yields, so that several impregnation cycles are ordinarily required to achieve the desired final density.

The carbon yield of pitches can be enhanced by high pressure impregnation/carbonization processes. However, high pressure vessels are capital intensive and of limited size, thereby limiting the number of performs that can be densified in a single vessel. The very high pressures used also increase the risk of explosion. Alternatively, one can use liquid resins that have high carbon yields (>80%). Typical high char yield resins include synthetic mesophase pitches (e.g., AR mesophase pitch from Mitsubishi Gas Chemical Company, Inc., a catalytically polymerized naphthalene) as well as thermally or chemically treated coal tar and petroleum derived pitches. However the high viscosity and associated high processing temperatures of these materials is problematic.

Resin Transfer Molding (RTM) technologies are widely used in the aerospace, automotive, and military industries as a means of densification of porous performs. RTM is often used for the production of polymer based composites. A fibrous preform or mat is place into a mold matching the desired part geometry. Typically, a relatively low viscosity thermoset resin is injected at low temperatures (100-300° F., 38-149° C.), using pressure or induced under vacuum, into a porous body contained within a mold. The resin is cured within the mold and the part is then removed from the mold.

U.S. Pat. No. 4,986,943 discloses a method for oxidation stabilization of pitch-based matrices from carbon-carbon composites. In this method, a lattice work of carbon fibers is infiltrated with a pitch-based matrix precursor, oxidized in an oxygen-containing atmosphere at a temperature below the pitch softening point, and carbonized to convert the matrix material into coke.

U.S. Pat. No. 5,248,467 teaches an apparatus for use in a VPI method. A mold cavity containing fibers and/or inserts is placed under vacuum and then the molding material is injected into the cavity under vacuum. The patent teaches that injection of the matrix molding material can be from any location on the mold, because there is nothing to displace and no need to consider flow characteristics of the matrix material in terms of displacing air toward a vent.

U.S. Pat. No. 5,306,448 discloses a method form resin transfer molding which utilizes a reservoir. The reservoir comprises a pressure yield porous sponge containing from 2 to 10 times the sponge's weight in resin. The resin reservoir facilitates resin transfer molding by providing a resin reservoir that can ensure the desired impregnation of a porous preform such as a porous fiber reinforced composite.

U.S. Pat. No. 5,770,127 describes a method for making a carbon or graphite reinforced composite. A rigid carbon foam preform is placed within a sealed flexible bag. A vacuum is created within the bag. Matrix resin is introduced into the bag through an inlet valve to impregnate the preform. The preform is then cured by heating. The resulting carbon or graphite structure is then removed from the bag.

In typical resin extrusion processing, a viscous melt is forced under pressure through a shaping die in a continuous stream. The feedstock may enter the extrusion device in the molten state, but often it consists of solid particles that are subject in the extruder to melting, mixing, and pressurization. The solid feed may be in the form of pellets, powder, beads, flakes, or ground material. The components may be premixed or fed separately through one or more feed ports. Many extruders incorporate a single screw rotating in a horizontal cylindrical barrel, with an entry port mounted over one end (feed end) and a shaping die mounted at the discharge end (metering end). Twin screw extruders are widely employed for difficult compounding applications and for extruding materials having high viscosity. Twin screw designs can be either counter-rotating or co-rotating, with the screws intermeshing or not intermeshing. A series of heaters can be located along the length of the barrel. In RTM processes, the shaping die at the metering end is replaced with a mold containing a porous body or preform.

U.S. patent application Ser. No. 09/653,880, now U.S. Pat. No. 6,537,470 B1, describes tooling that enables resin infiltration of porous preforms (e.g., flat annular brake disk performs) from the top and bottom simultaneously. This tooling and melt flow pattern works well for many fiber architectures. However, low density nonwoven fabric-based preforms are often better infiltrated employing the "through thickness" infiltration of the present invention.

Thus, in some cases, infiltrating a thick porous disk from both top and bottom simultaneously creates a risk of damaging the preform, since when two melt streams meet in the interior of the web during the resin fill process, an opposing force is created. The force initiates a wedge-type effect as it drives the resin melt streams, and any gases trapped within the porosity of the preform, towards the inside diameter (ID) and outside diameter (OD) locations within the fiber matrix of the preform. With some fiber architectures, i.e., low density nonwovens, this flow in the plane is problematic, and results in delaminations, cracks, etc., at various melt injection pressures, in the preform that is being melt infiltrated with resin. Specifically, nonwoven preform precursors having low densities (<1.1 g/cc), after a first cycle of CVD, especially large diameter preforms (>16 inches), may delaminate during RTM processing using the apparatus described in application Ser. No. 09/653,880.

SUMMARY OF THE INVENTION

This invention provides a resin or pitch infiltration molding process, which process includes: providing a heated preform in a mold that is heated to a temperature above a melting point of the resin or pitch to be infiltrated into the preform; injecting a high melting point, high viscosity, molten resin or pitch into the mold to effect a unidirectional impregnation of the preform via a pressure gradient in the mold, wherein the pressure gradient is provided by steps or protusions in the mold; permitting the resin- or pitch-infiltrated preform to cool below the melting point of the resin or pitch; and removing the impregnated preform from the mold. The preform may be heated within the mold prior to the melt injection step, but processing is faster when the mold is preheated prior to its placement in the mold. As described hereinbelow, vacuum and/or venting may be provided to the mold during the resin or pitch injection.

In accordance with this invention, the preform may be a woven fiber preform, a carbon fiber preform, a nonwoven fiber preform, a random fiber preform with a binder, a rigidized preform, a foam preform, or a porous carbon body preform, and the resin or pitch may be a pitch derived from coal tar, petroleum, or synthetic pitch precursors or may be a mesophase pitch, or may be a high char yield thermoset resin.

After the RTM process of this invention is complete, the impregnated preform is generally carbonized. The impregnated preform may be stabilized by heating it in the presence of oxygen prior to carbonization of the oxidized impregnated preform.

This invention also provides a molding apparatus for the rapid transfer of molten resin or pitch in an infiltration molding process. The apparatus of this invention includes: means (e.g., a single screw extruder or an optionally vented twin screw extruder) for melting and conveying a resin or pitch; a mold arranged so that resin or pitch is conveyed from the melting and conveying means to a mold insert cavity within the mold. In the apparatus of this invention, the mold has protrusion means, e.g., an annular outside diameter structure that abuts a major upper portion of the outside diameter of a porous body within the mold insert cavity, for effecting a pressure gradient and flow of the resin or pitch from one side of the mold insert cavity toward an opposite side of the mold insert cavity. The apparatus of this invention also has locating means for positioning a porous body within the mold insert cavity in a position that brings about unidirectional flow of the molten resin or pitch through the porous body. The apparatus normally involves means disposed at the mold to constrain the mold during injection of the resin or pitch into the mold.

In the apparatus of this invention, the protrusion means may be an outside diameter ring that extends from the top of the mold insert cavity around and along the thickness of the porous body that is located within the mold insert cavity down to a location within the mold insert cavity that leaves a gap that is just wide enough to permit the escape of gases along an outside annular edge of the porous body.

The apparatus of this invention is configured so that the unidirectional flow of the molten resin or pitch is from an inner area, e.g., from a top portion of the inner area, of the mold insert cavity through the porous body toward an outer area of the mold insert cavity.

In the molding apparatus of this invention, the mold can comprise: a top portion; a bottom portion opposed to the top portion so that the top portion and the bottom portion form a mold cavity; at least one gate disposed in the top portion or the bottom portion of the mold; a valve for admitting resin or pitch into said gate; and an arrangement for venting and/or providing vacuum to the mold. The molding apparatus of this invention can also include a hydraulically actuated piston accumulator disposed between the melting and conveying means and the mold.

Thus this invention provides a rapid resin or pitch transfer molding apparatus that includes: an extruder; a mold arranged so that resin or pitch can be extruded from the extruder into the mold; a press to constrain the mold during resin or pitch injection; and a heat exchanger for the extruder and the mold. This mold includes: a top portion; a bottom portion opposed to the top portion so that the top portion and the bottom portion form a mold cavity; a gate that is disposed in the bottom portion of the mold; a valve for admitting resin or pitch into said gate; an arrangement for venting the mold; and protrusion means—for instance, a radially extending protrusion having at least one vent port and located at the outer area of the mold cavity—for effecting a pressure gradient and unidirectional flow of the resin or pitch from an inner area of the mold cavity toward an outer area thereof.

In the molding apparatus of this invention, the gate may be disposed in the center of the bottom portion of the mold and may comprise a nozzle, the top portion and the bottom portion of the mold may be separated by shim stock of about 0.005-0.040 inches in thickness, and/or the protrusion means may extend into the mold cavity about 0.25-0.5 inches.

The through thickness tooling provided by this invention is engineered to permit gases contained in the mold cavity (including those gases located within the preform in the mold cavity) to be pushed through tight vents (protrusions or steps) at the ID bottom and OD top and bottom locations within the mold and out through the mold vents. With this design, essentially all of the pressure to which the preform is subjected comes only from the flow resistance created by the preform itself. That is, the preform is subjected to surface resistance pressure only. No opposing hydraulic pressure is applied. The present tooling design also allows for a slight flow of material through the plane of the preform by channels created in the fiber matrix of the preform.

BRIEF DESCRIPTION OF THE DRAWINGS

The present invention will be more fully understood from the detailed description given hereinbelow, and from the accompanying drawings. The drawings are provided by way of illustration only, and thus do not limit the present invention. The drawings are not to scale.

DETAILED DESCRIPTION OF THE INVENTION

Figure 1:
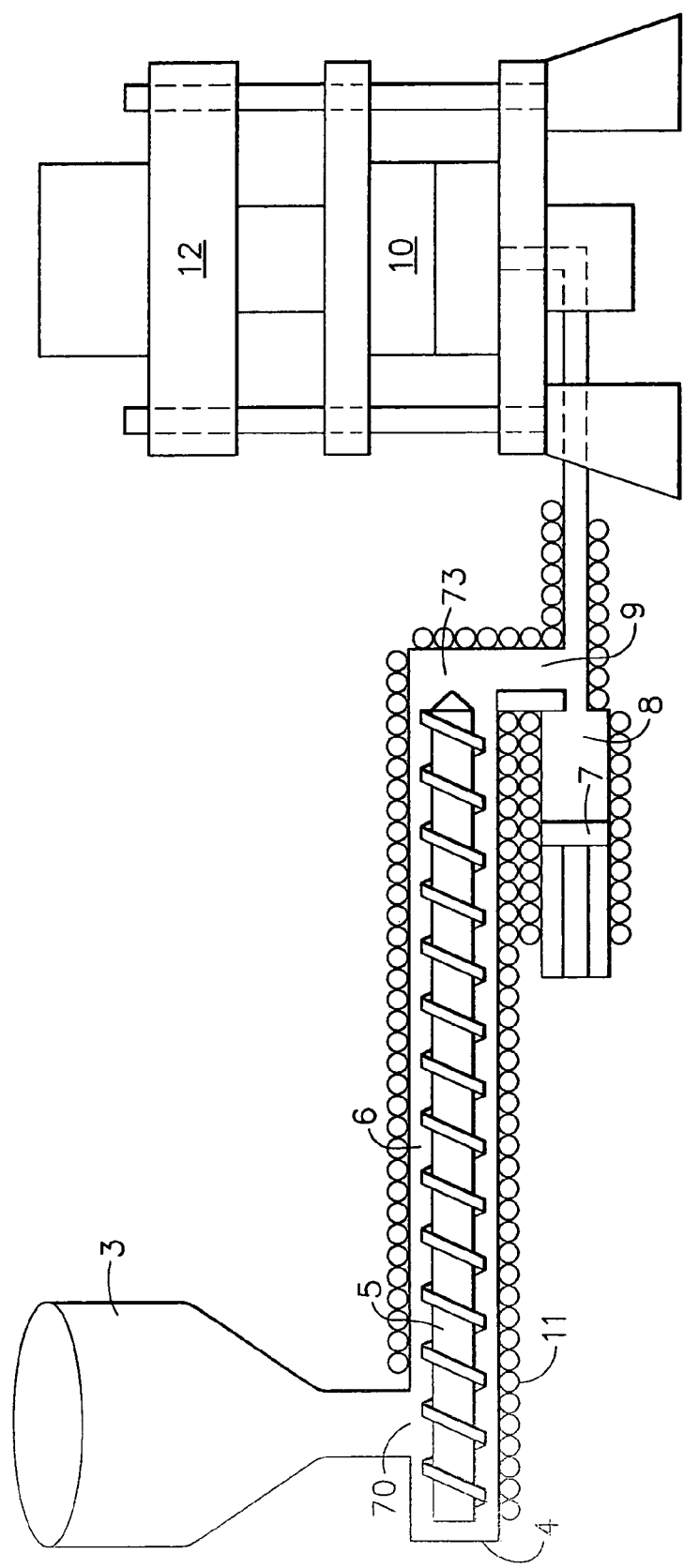
FIG. 1 shows an extrusion resin molding apparatus according to an embodiment of the present invention.

The present invention provides processes form rapid infiltration and densification of porous fibrous preforms and rigid porous bodies using high viscosity, high char yield resin. The present invention also provides an extruder (single screw or twin screw) or similar apparatus to uniformly melt and mix high viscosity resin injection media. The present invention also proves an extruder apparatus that may be fitted with an accumulator to hold a controlled volume of molten resin before injection of the resin under pressure into a mold.

The present invention provides a mold that efficiently distributes resin uniformly throughout a preform. In accordance with this invention, the mold may be configured with a top portion and a bottom portion. The bottom portion of the mold may have a gate, with a nozzle, disposed in the center of a face thereof. The mold can have tapered cavities to promote adequate molten resin flow throughout the mold. Thus, an apparatus in accordance with this invention may include a mold with a top half, a bottom half opposed to the top half so that the top half and the bottom half of the mold form a mold cavity, at least one gate disposed in the top half or the bottom half of the mold, a valve that can admit resin into the gate, and an arrangement for providing venting and/or vacuum to the mold.

The present invention provides a resin transfer molding process that includes: placing a porous preform into a mold; injecting a molten resin or pitch into the mold; permitting the resin or pitch to cool below its melting point; and removing the impregnated preform from the mold. Multiple parts (preforms) can be loaded into a single mold. The preform(s) can be heated to a temperature between about 290-425° C. (554-797° F.) either prior to or after being placed in the mold. The mold can be heated to a temperature between about 138-310° C. (280-590° F.).

The densified part, following densification, can be treated at an elevated temperature in an oxygen-containing environment to effectively crosslink the thermoplastic resin. This process fixes the matrix in place within the preform and prevents softening, bloating, and/or expulsion of the matrix during subsequent heating about the resin melting temperature. Oxygen stabilization may entail heating the densified part in the presence of oxygen to a temperature less than the softening point of the resin, for instance to about 170° C. (338° F.). Additional treatments of the densified part may include carbonization, graphitization, and reimpregnation using RTM or CVD/CVI.

Resins that are contemplated by this invention include thermoplastic and thermoset liquid precursors such as for instance phenolic resins, furfuryl resins, and pitches derived from coal tar and petroleum. Also contemplated are synthetic, thermally treated, and catalytically converted pitches, mesophase pitches, and pre-ceramic polymers (such as CERASET, available from Commodore Technologies, Inc.). High char yield thermoset resins are particularly preferred.

As will be readily apparent to those skilled in the art, additives such as blowing agents (e.g., nitrogen gas), clays, silicates, carbon powders or fibers, antioxidants, and/or crosslinking agents may be added to the resin or pitch.

Preforms that are contemplated by this invention include woven fiber preforms, carbon fiber preforms, nonwoven fiber preforms, binder-treated random fiber preforms, rigidized preforms, foam preforms, and porous carbon body preforms. It is conventional in the production of nonwoven preforms to needle punch together segments of fabric using traditional textile processing techniques. The preform can be carbonized or graphitized. The preform can be infiltrated using CVD/CVI. The traditional process used to densify nonwoven preforms for aircraft brake applications is CVD. The preform can be previously resin-infiltrated. The preform is preferably heated to a temperature above the resin or pitch melting point prior to RTM processing. The RTM process completely fills all available open porosity, including e.g. any large pores created by needle punching, with a carbon precursor resin. Subsequent to RTM processing, the resin within the preform is carbonized, as described hereinbelow.

Figure 5A:
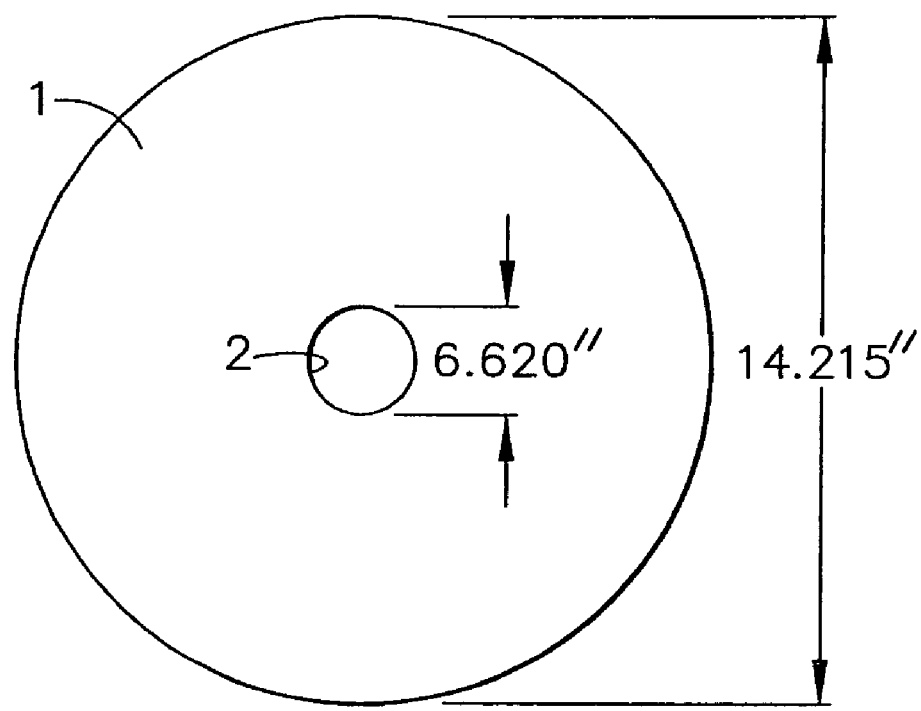
FIGS. 5A and 5B show overhead (5A) and side (5B) views of a fibrous preform that can be operated upon in accordance with the present invention.
Figure 5B:
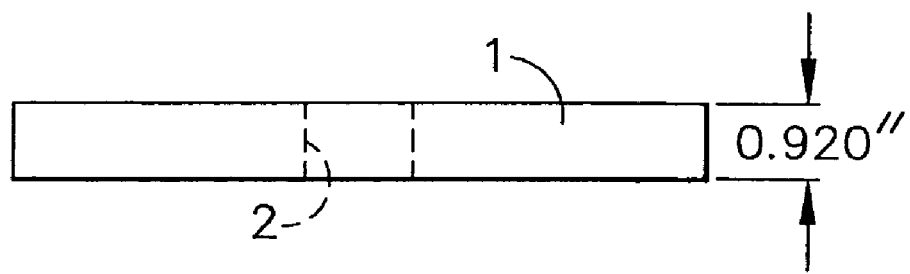

The present invention is particularly valuable in the manufacture of brake components for aircraft landing systems. FIGS. 5A and 5B show (not to scale) a preform 1, configured as a brake disc for a jet airplane. Preform 1 has an inside diameter 2 of 6.620 inches (16.81 cm), an outside diameter of 14.215 inches (36.11 cm), and a thickness of 0.920 inches (2.34 cm).

The Apparatus

FIG. 1 shows a resin transfer molding apparatus of the present invention. Raw material, such as AR mesophase pitch resin (available from Mitsubishi Gas Chemical Company, Inc.) is loaded into a hopper 3 attached to an extruder 4. The extruder can be, for instance, a single screw extruder, a twin screw extruder, a vented twin screw extruder, or a reciprocating screw extruder. Extruder screw 5 can be either a single screw or double screw, but single screw extruders are preferred for reasons of economy. A feed throat 70 receives resin from hopper 3 and feeds extruder screw 5, which progressively heats the resin as it is transported down the length of a barrel 6. As those skilled in the art will appreciate, mixing enhancements such as a maddock mixer and/or a static mixer (not shown) may be located in the screw near resin delivery end 73 of barrel 6. A maddock mixer helps ensure a more homogeneous melt by adding mechanical work to the resin, breaking up resin flow patterns and improving the mixing of any additives in a single screw extruder by applying shear to the material. A static mixer may contain static mixing elements, such as stainless steel bars welded together, which act as flow channels to carry melted resin (and any other additives) from the center of the barrel to the wall of the barrel and back again. The maddock mixer and static mixer elements at the end of the extruder screw thus can enhance the use of a single screw extruder by improving the mixing of the resin melt and reducing temperature variation.

After mixing, the resin is transported from resin delivery end 73 of barrel 6 into an accumulator 8. The accumulator may be, for instance, a piston accumulator, such as a hydraulically actuated piston accumulator. The resin melt pressure created by the extruder forces a piston 7 inside accumulator 8 back to the desired position. This invention can also be practiced by direct injection of the melt, without utilization of accumulator 8 and piston 7 (configuration not shown).

When the accumulator is used, once the desired volume of resin has been accumulated, the accumulator piston 7 moves forward and forces the controlled volume of resin through the transfer pipe 9 into the mold cavity. An arrangement of valves (not shown) is provided in relation to the transfer pipe to control flow and backflow of the resin, respectively. The part to be infiltrated is contained within a mold 10. For the purposes of this invention, a mold is defined as a containing vessel in which the porous body or preform is contained and into which infiltration of the resin occurs. This invention makes use of mold inserts that are replaceable and that are configured to correspond to the preform being infiltrated.

Mold temperature is controlled by using an oil circulator equipped with a heat exchanger or by a combination of electric heaters and Isobars. The extruder temperature is maintained by a series of water-cooled cast aluminum heaters (11) and a series of temperature controllers (not shown).

The part to be infiltrated is preheated to a temperature at or above the resin melt temperature. The preheating operation can be carried out within the mold cavity, but in order to optimize cycle time, it is preferably carried out in an oven.

The mold is contained or located within a press 12. The press 12 can be a hydraulic press. Although a vertically acting press is depicted in FIG. 1, a horizontally acting press could also be used. Also, the mold need not necessarily be located entirely within the press. The clamping force of press 12, which is dependant on the size of part used (a 500 ton press is typical) counteracts the pressure of the resin being forced into the mold cavity. The mold 10 is also heated. The infiltrated part remains within the mold 10 until the resin cools below the melting point, and the part is then removed.

An optional, although less economical, method of process operation in accordance with this invention involves evacuating the mold before and/or during infiltration. This option requires that the mold seal reasonably well and hold the vacuum. However, the use of a vacuum requires additional complexity and cost.

U.S. patent application Ser. No. 09/653,880, filed 1 Sep. 2000, and entitled RAPID DENSIFICATION OF POROUS BODIES (PREFORMS) WITH HIGH VISCOSITY RESINS OR PITCHES USING A RESIN TRANSFER MOLDING PROCESS, now U.S. Pat. No. 6,537,470 B1, describes processes and apparatuses of which those disclosed herein constitute improvements. application Ser. No. 09/653,880 is expressly incorporated by reference herein.

The Mold Insert

Figure 2:
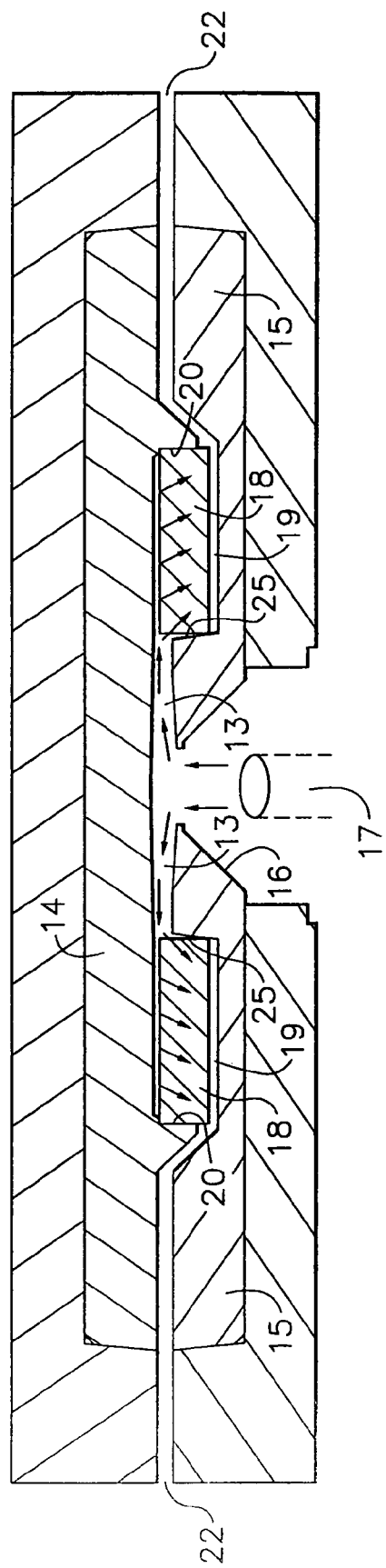
FIG. 2 shows a cross-section of a mold according to an embodiment of the present invention, including a schematic of the resin flow around and through the preform.

The melt infiltration of the present invention can be performed in various directions. In addition to from inside top to outside bottom (as illustrated in FIG. 2), it can also be performed from inside bottom to outside top, or even from the outside to the inside of the preform, although this approach would require a more complicated resin delivery system. Based upon the information presented in this application, those skilled in the art will readily conceive of alternative melt infiltration routes employing the principles of this invention.

FIG. 2 shows a cross-section of a mold according to an embodiment of the present invention. An annular ring preform 18 is placed in an annular mold chamber 19. The annular mold chamber 19 is center fed from below through gate 13, controlled by a top mold insert 14 and a bottom mold insert 15. The bottom mold insert 15 is fitted with a nozzle 16 having a shut off rod 17. The annular mold chamber 19 is fitted with an ID locating ring 25, which serves to hold the annular ring preform 18 in place during melt infiltration. The annular mold chamber 19 is also fitted with an OD ring 20, and with a vent 22. The presence in the annular mold chamber 19 of the OD ring 20 creates a resistance to the flow of melted resin entering through gate 13, such that the high viscosity resin passes through the annular ring preform 18 into the vent 22, thereby infiltrating the preform. The vent 22 eliminates trapped air, volatile gases, and excess resin. Although the process could be vacuum-assisted, the process of this invention is so effective that excellent results are obtained without the application of vacuum.

Figure 3:
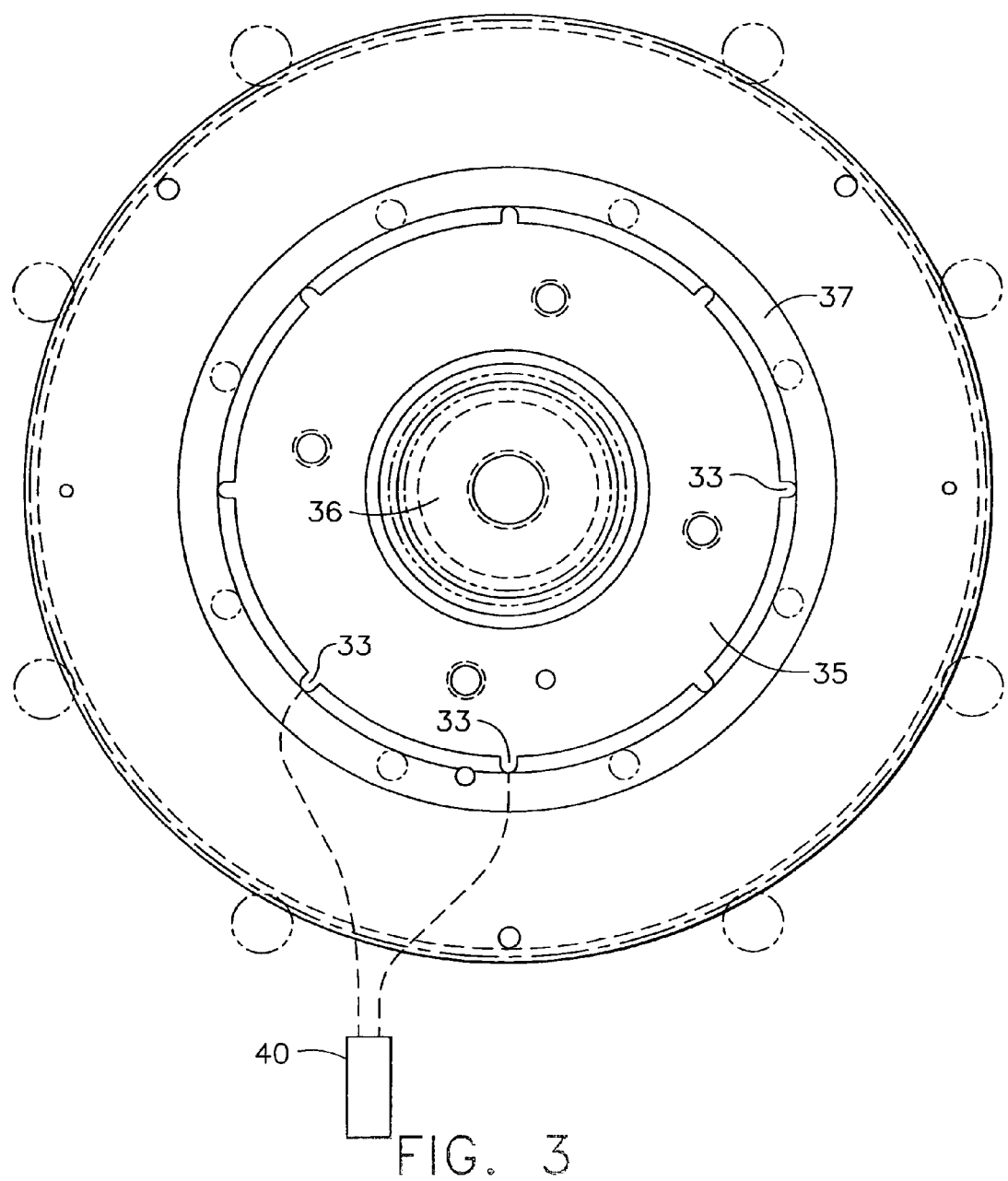
FIG. 3 shows an overhead view of a venting configuration for the bottom half of a mold according to an embodiment of the present invention

FIG. 3 shows an overhead view of a bottom half of a mold insert according to an embodiment of the present invention. A central mold insert cavity 35 has a gate 36 for injection of melted resin or pitch. A vent ring 37 is fitted with eight internal vent ports 33. When this process is conducted in the absence of induced vacuum, the internal vent ports 33 permit gases to escape through the mold surface. Other gases, and excess resin, escape through vent 22 (illustrated in FIG. 2). If the process is to be conducted under vacuum conditions, the vent ports 33 may be channeled to external vent ports, such as vent port 40.

Figure 4:
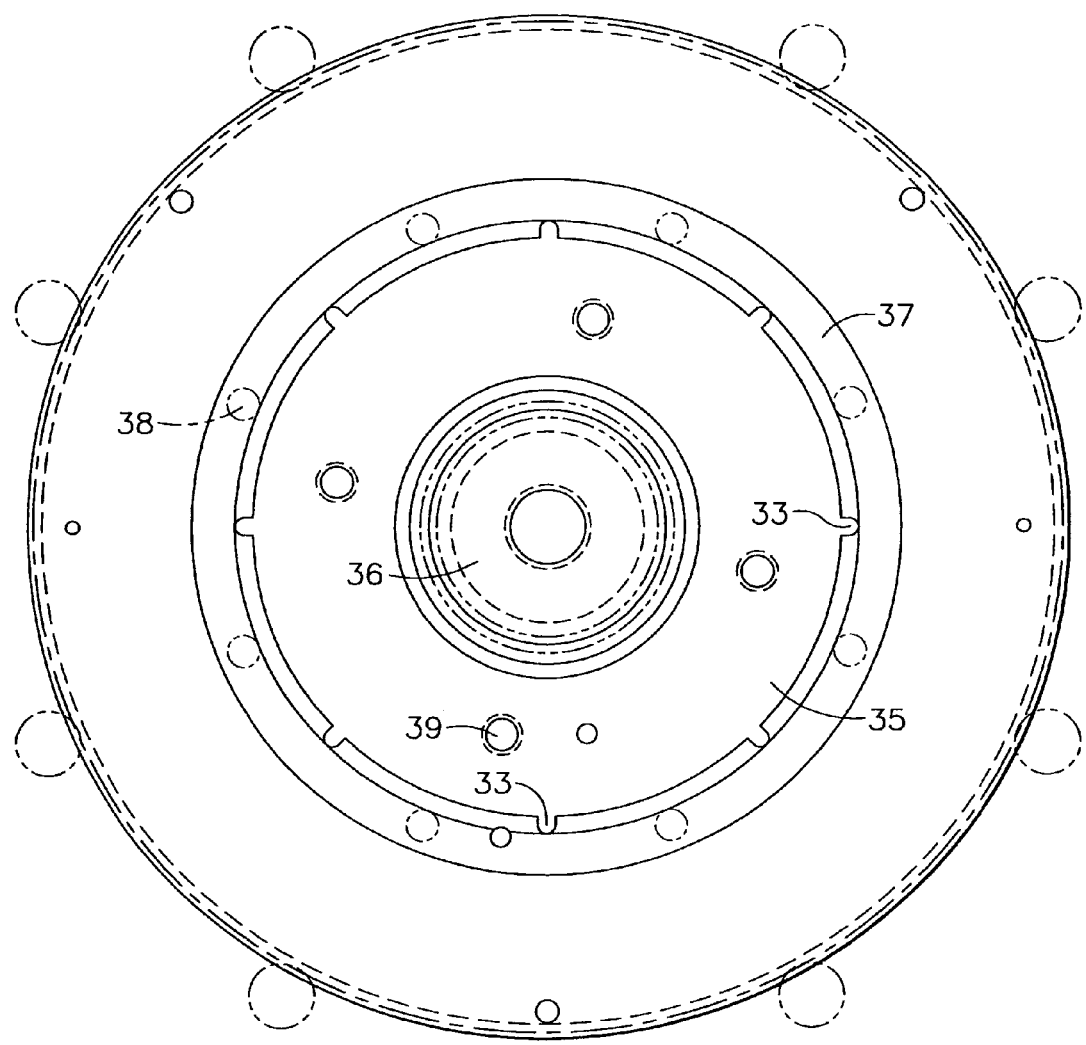
FIG. 4 shows an overhead view of an ejector pin configuration for the bottom half of a mold according to an embodiment of the present invention

FIG. 4 shows an overhead view of a bottom half of a mold insert according to an embodiment of the present invention. A central mold insert cavity 35 has a gate 36 for injection of melted resin or pitch. A vent ring 37 is fitted with eight internal vent ports 33. FIG. 4 also illustrates interior ejection pins 39 and exterior ejection pins 38. Ejection pins 38 and 39 facilitate ejection of the infiltrated preform from the mold.

The mold cavity can be treated with a release agent to facilitate removal of the densified preform. A typical release agent is Release Coating 854, available from Huron Technologies, Inc.

EXAMPLE

Infiltration of AR mesophase pitch was performed on a porous nonwoven fiber preform that had previously been subjected to 200 hours of CVD densification. This preform was a flat annular ring having an inside diameter of 6.620 inches, an outside diameter of 14.215 inches, and a thickness of 0.920 inches. An injection molding apparatus of the type described in FIG. 1 was used, in which the hydraulic press had a 500 ton clamping capability. The accumulator had a resin volume of about 420 cubic inches (6833 cc). When completely filled with AR pitch resin, the accumulator contained approximately 37 lbs (16.8 kg) of resin. Heat was supplied to the extruder by an electrical heater and the mold was heated by a combination of electric heaters and Isobars. The extruder screw created pressure within the resin melt, and the pressure was maintained in the accumulator. The screw was rotated at 30 rpm, providing an initial infiltration pressure of 1300 psi (9.0 MPa). The hot oil circulator was set to 450° F. (232° C.). The preform to be infiltrated was preheated to 400° C. (752° F.) in an oven and then transferred into the mold cavity just prior to infiltration. Keeping the part above the melting point during injection permits the resin to flow throughout the preform. The resin was injected into the mold, and thus into the preheated preform, from the accumulator for a period of about 20 seconds. Back pressure on the accumulator was used to maintain mold cavity pressure during infiltration, also for about 20 seconds. The target weight for the infiltrated preform was 3351 grams (7.38 lbs) and the actual weight of the infiltrated preform was found to be 3370 grams (7.42 lbs).

Pressure Control

The present invention enables densification of preforms with molten pitch by extrusion and injection of pitch. However, extrusion and injection of pitch into the mold and preform using the injection unit to supply uniform pressure is a very rapid process. Injection of preforms happens quickly, on the order of less than a minute to a few seconds, depending on the size of the preform. The injection process is quick enough to permit the attainment of much cooler mold temperatures, even below the resin melting point. However, the porous preform needs to be preheated to a temperature above the pitch softening point to permit the molten resin to flow, under pressure, into the preform. Industrial efficiency requires that this process be completed rapidly.

With proper pressure control, preforms can be impregnated more rapidly without generating extreme forces in the mold cavity that could cause the press to open during the impregnation process. This pressure is controlled through the hydraulic system and the mold venting. The mold will open when the forces inside the mold chamber are greater than the applied tonnage of the clamp, taking into consideration the area of the mold chamber and the tonnage applied (e.g., 500 tons). The melt pressures during the impregnation process will normally be lower than, for instance, 3000 psi in the mold for aircraft brake disc preforms.

Finishing the Preforms

After the preforms are infiltrated with, e.g., the mesophase pitch resin, they may be subjected to follow on processing to convert the organic resin into carbon which forms part of the carbon matrix in a carbon-carbon composite material. The infiltrated aircraft brake discs, for example, are subjected to oxidative stabilization. The parts are placed in an air-circulating oven at a temperature of 150-240° C. (302-464° F.). The oxygen reacts with the pitch and cross-links the resin, converting it from a thermoplastic resin into a thermoset resin. After stabilization, the part may be carbonized by heating in an inert atmosphere furnace to a temperature above 650° C. (1202° F.), typically at 900° C. (1652° F.). After carbonization, the part can be heat-treated (graphitized), for instance at about 1800° C. (3272° F.) before further processing. The part can then be further densified using either CVD or RTM as illustrated hereinabove.

What is claimed is:

1. A molding apparatus for the rapid transfer of molten resin or pitch in an infiltration molding process, said apparatus comprising:

means for melting and conveying a resin or pitch;

a mold comprising a top portion; a bottom portion opposed to the top portion so that the top portion and the bottom portion form a mold cavity; at least one gate disposed in the top portion or the bottom portion of the mold; a valve for admitting resin or pitch into said gate; and an arrangement for venting and/or providing vacuum to the mold, said mold being arranged so that resin or pitch is conveyed from the melting and conveying means to a mold insert cavity within the mold, the mold containing protrusion means having at least one vent port for effecting a pressure gradient and flow of the resin or pitch from one side of the mold insert cavity toward an opposite side of the mold insert cavity and containing locating means for positioning a porous body within the mold insert cavity in a position that brings about unidirectional flow of the molten resin or pitch through the porous body; and means disposed at the mold to constrain the mold during injection of the resin or pitch into the mold.

2. The molding apparatus of claim 1, wherein the unidirectional flow of the molten resin or pitch is from an inner area of the mold insert cavity through the porous body toward an outer area of the mold insert cavity.

3. The molding apparatus of claim 1, wherein the molten resin or pitch is conveyed into a top portion of an inner area of the mold insert cavity.

4. The molding apparatus of claim 3, wherein the protrusion means comprises an annular outside diameter structure that abuts a major upper portion of the outside diameter of a porous body within the mold insert cavity.

5. The molding apparatus of claim 4, wherein the protrusion means comprises an outside diameter ring that extends from the top of the mold insert cavity around and along the thickness of the porous body down to a location within the mold insert cavity that leaves only a gap suitable to permit the escape of gases along an outside annular edge of the porous body.

6. The molding apparatus of claim 1, further comprising a hydraulically actuated piston accumulator disposed between the melting and conveying means and the mold.

7. The molding apparatus of claim 1, wherein the melting and conveying means is a single screw extruder or an optionally vented twin screw extruder.

8. The molding apparatus of claim 1, having positioned within said mold insert cavity a porous body consisting of a porous nonwoven fiber preform in the shape of a flat annular ring having an inside diameter of 6.620 inches, an outside diameter of 14.215 inches, and a thickness of 0.920 inches.

9. The molding apparatus of claim 1, wherein the mold cavity is configured to receive a flat annular ring-shaped body having an inside diameter of 6.620 inches, an outside diameter of 14.215 inches, and a thickness of 0.920 inches.

* * * * *